United States Patent
Brogan et al.

(10) Patent No.: US 11,358,444 B2
(45) Date of Patent: Jun. 14, 2022

(54) DOOR ENTRY SENSOR

(71) Applicant: Faraday&Future Inc., Gardena, CA (US)

(72) Inventors: Cian John Francis Brogan, Los Angeles, CA (US); Matthew Richard Partsch, San Pedro, CA (US); Paul G. Jabra, Sterling Heights, MI (US)

(73) Assignee: Faraday & Future Inc., Gardena, CA (US)

( * ) Notice: Subject to any disclaimer, the term of this patent is extended or adjusted under 35 U.S.C. 154(b) by 66 days.

(21) Appl. No.: 16/080,664

(22) PCT Filed: Feb. 28, 2017

(86) PCT No.: PCT/US2017/020051
§ 371 (c)(1),
(2) Date: Aug. 28, 2018

(87) PCT Pub. No.: WO2017/151685
PCT Pub. Date: Sep. 8, 2017

(65) Prior Publication Data
US 2019/0063139 A1 Feb. 28, 2019

Related U.S. Application Data

(60) Provisional application No. 62/311,266, filed on Mar. 21, 2016, provisional application No. 62/301,492, filed on Feb. 29, 2016.

(51) Int. Cl.
*B60J 5/04* (2006.01)
*B60J 10/75* (2016.01)
(Continued)

(52) U.S. Cl.
CPC ............ *B60J 5/0411* (2013.01); *B60J 5/0426* (2013.01); *B60J 10/75* (2016.02); *B60R 13/04* (2013.01);
(Continued)

(58) Field of Classification Search
CPC .................................................... B60R 13/04
See application file for complete search history.

(56) References Cited

U.S. PATENT DOCUMENTS 2,457,312 A  12/1948  Kramer
2,617,679 A *  11/1952  Maguire .................. B60J 10/75
                                                    296/153
(Continued)

FOREIGN PATENT DOCUMENTS

CN    104470742 A    3/2015
CN    204547703 U    8/2015
(Continued)

OTHER PUBLICATIONS

Machine translation of DE102008038922.*
International Search Report dated Jun. 26, 2017 for International Application No. PCT/US2017/020051.

*Primary Examiner* — Marcus Menezes
(74) *Attorney, Agent, or Firm* — Veros Legal Solutions, LLP

(57) ABSTRACT

A belt molding and sensor combination for a door of a vehicle may include at least one sensor and a belt molding. The at least one sensor may be configured to emit signals upon the detection of an action intended to cause a door to open or close, and the at least one sensor may present a sensor outer surface. The belt molding may be configured to extend along at least a portion of a length of a door, and include a cap which presents an outer surface. The belt molding may be configured to be mounted on a door. The sensor outer surface may provide an extension of a cap outer surface, such that the sensor outer surface and the cap outer surface combine to provide an uninterrupted outer surface where the sensor outer surface and the cap outer surface abut against one another.

20 Claims, 10 Drawing Sheets

(51) Int. Cl.
    *E05F 15/00*         (2015.01)
    *E05F 15/73*         (2015.01)
    *B60R 13/04*        (2006.01)

(52) U.S. Cl.
    CPC .............. *E05F 15/00* (2013.01); *E05F 15/73* (2015.01); *E05Y 2900/531* (2013.01)

(56) References Cited

U.S. PATENT DOCUMENTS

| | | | |
|---|---|---|---|
| 9,156,335 B1 * | 10/2015 | Harter | E05B 81/76 |
| 2005/0206182 A1 | 9/2005 | Depue et al. | |
| 2007/0007068 A1 * | 1/2007 | Weingaertner | E05F 15/42 |
| | | | 180/274 |
| 2007/0096905 A1 | 5/2007 | Ieda et al. | |
| 2011/0313619 A1 * | 12/2011 | Washeleski | E05F 15/40 |
| | | | 701/36 |
| 2012/0169355 A1 * | 7/2012 | Cho | G01V 3/088 |
| | | | 324/658 |
| 2013/0270855 A1 * | 10/2013 | Fukui | B60J 10/36 |
| | | | 296/146.1 |
| 2015/0183306 A1 | 7/2015 | Shimizu et al. | |
| 2015/0239327 A1 | 8/2015 | Brancaleone et al. | |
| 2016/0167621 A1 * | 6/2016 | Luu | B60R 25/2054 |
| | | | 701/48 |
| 2017/0136856 A1 * | 5/2017 | Sugie | G01S 17/931 |

FOREIGN PATENT DOCUMENTS

| | | | | |
|---|---|---|---|---|
| DE | 102008038922 A1 * | 2/2010 | ............ | B60R 25/24 |
| KR | 10-2015-0042383 A | 4/2015 | | |

\* cited by examiner

DOOR ENTRY SENSOR

CROSS-REFERENCE TO RELATED APPLICATIONS

This application is a National Phase application under 35 U.S.C. § 371 of International Application No. PCT/US2017/020051, filed Feb. 28, 2017, which claims the benefit of U.S. Provisional Application No. 62/301,492, filed Feb. 29, 2016, and U.S. Provisional Application No. 62/311,266, filed Mar. 21, 2016, the entire disclosures of which are hereby incorporated by reference for all intended purposes.

TECHNICAL FIELD

The present disclosure generally relates to sensors and systems for operating a vehicle door.

BACKGROUND

A vehicle door is usually equipped with a handle. Such a handle is often located below the outer belt line of the door and allows people to manually open a door. Although this arrangement may be easy to implement, there are some shortcomings. For example, an operator may have to push and pull on the doors, which may be less convenient than other methods. Doors that open and close automatically, also referred to as powered doors, may not require a user to pull or push them open, and instead may rely on one or more actuators to open and close the door. When a door is powered, pushing and pulling the door may be inconvenient or uncomfortable, since a powered door may move at a different speed than the speed that an operator expects a door being pushed or pulled to move. Therefore, it may be desirable to cause a powered door to begin opening or closing using a device other than a handle.

SUMMARY

One aspect of the present disclosure is directed to a belt molding and sensor combination for opening or closing a door of a vehicle. The belt molding and sensor combination may include at least one sensor configured to emit signals upon detection of an action intended to cause the door to open or close. The sensor may present a sensor outer surface. The belt molding may be configured to extend along at least a portion of a length of the door. The belt molding may include a cap that may also present an outer surface. The belt molding may be configured to be mounted on the door. The sensor outer surface may provide an extension of the cap outer surface, such that the sensor outer surface and the cap outer surface combine to provide an uninterrupted outer surface where the sensor outer surface and the cap outer surface abut one another.

Another aspect of the present disclosure is directed to a system for opening and closing a door of a vehicle. The system may include at least one sensor configured to emit signals upon detection of an action intended to cause the door to open or close. The at least one sensor may include a sensor outer surface. The system may also include a belt molding configured to extend along at least a portion of a length of the door. The belt molding may include a cap that includes a cap outer surface. The sensor outer surface and the cap outer surface may be configured such that the sensor outer surface provides an extension of the cap outer surface. In such a configuration, the sensor outer surface and the cap outer surface may combine to provide an uninterrupted outer surface where the sensor outer surface and the cap outer surface abut one another. Also, the system may include a controller configured to receive signals from the at least one sensor. The controller may also be configured to control the operation of an actuator configured to open and close the door in response to receiving the signals.

DETAILED DESCRIPTION

The disclosure is directed to a system for opening and closing a vehicle door. The vehicle on which the system and method may be implemented, may be an electric vehicle, a fuel cell vehicle, a hybrid vehicle, a conventional internal combustion engine vehicle, or combinations thereof. The vehicle may have any body style, such as a sports car, a coupe, a sedan, a pick-up truck, a station wagon, a sports utility vehicle (SUV), a minivan, or a conversion van. The vehicle may be configured to be operated by an operator, occupying the vehicle, or remotely controlled, and/or it may be autonomous.

In some embodiments, the system may be configured to open or close a door of the vehicle in different modes based on an operator's input. For example, the system may operate in a powered mode, in which at least a portion of the opening or closing is performed by one or more actuators controlled by a controller.

The system may also include one or more sensors that detect an action intended to open a door of a vehicle. For example, an operator may touch a sensor that appears to be part of a door belt line, which then causes a door to open or close. One or more sensors may include a surface facing in a direction away from the door. According to some embodiments, the sensor(s) may be included within a cap located at the end of a belt molding. For example, a belt molding may extend the length of a door and terminate where it reaches a cap, which may be associated with a surface of one or more sensors. Thus, a sensor and/or a cap may effectively serve as a belt molding, and may prevent the interior of the door from being exposed to external elements such as rain. According to some embodiments, the sensor(s) may be responsive to touch (e.g., a capacitive sensor) and/or pressure (e.g., a force sensor). The sensor(s) provide signals to a controller. According to some embodiments, in response to signals indicating the receipt of an action intended to open or close a door, a haptic feedback component may provide haptic feedback such as a vibration. Further, according to some embodiments, in response to signals indicating the receipt of an action intended to open or close a door, one or more LEDs may illuminate.

Figure 1:
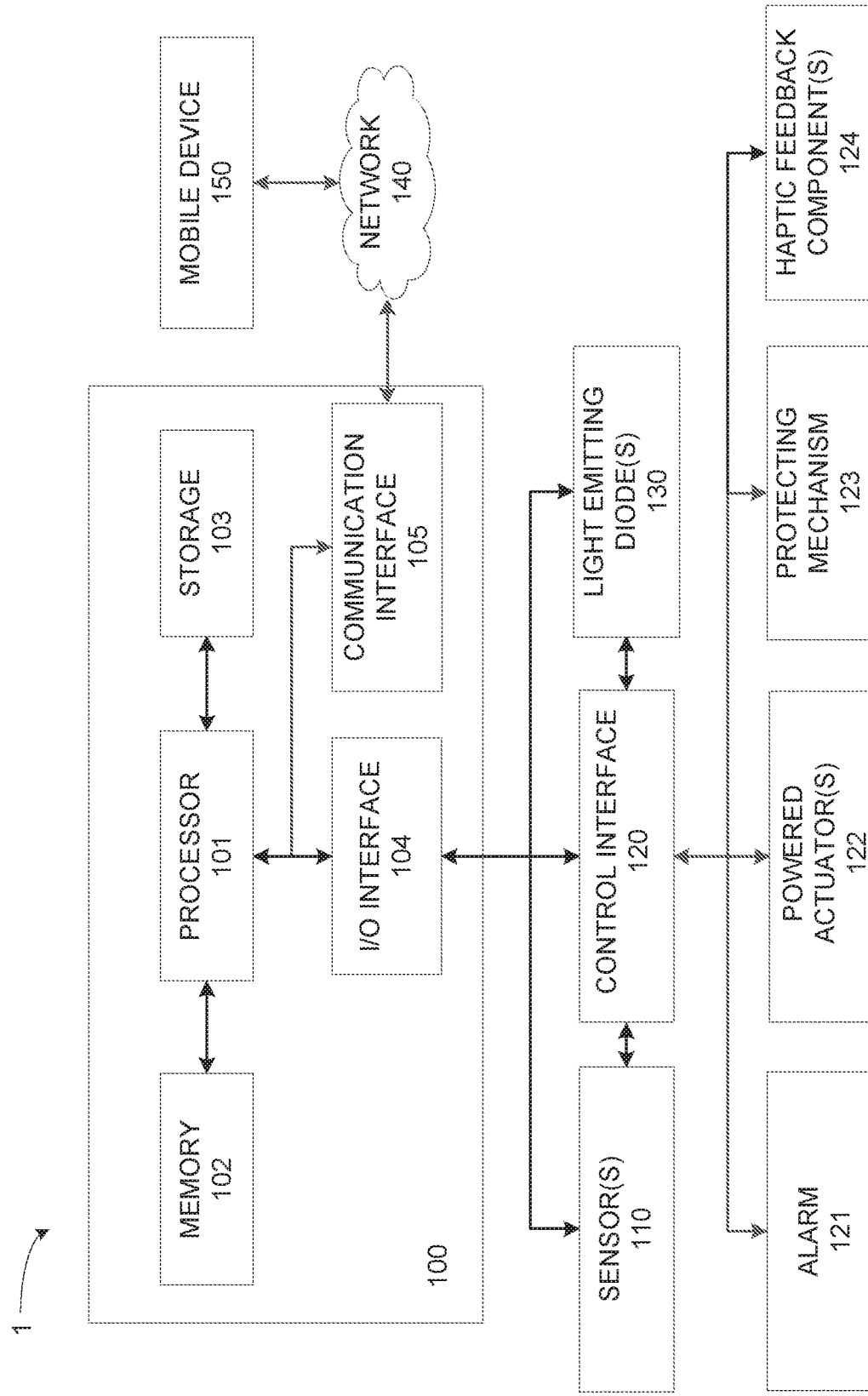
FIG. 1 is a block diagram of an exemplary embodiment of a system for opening a vehicle door.

FIG. 1 shows a block diagram of an exemplary system 1 for opening and closing a door of a vehicle. As illustrated in FIG. 1, system 1 may include a controller 100, one or more sensors 110, a control interface 120, and one or more light emitting diodes 130. System 1 may also include an alarm 121 configured to generate an audio, visual, or display alert under certain circumstances. System 1 may further include one or more actuators 122 configured to open or close the doors of the vehicle. In some embodiments, actuator(s) 122 may be powered. Actuators 122 may be one of a linear actuator or a motor configured to cause a door to move to a destination position determined by controller 100. For example, actuators 122 may be electrically, hydraulically, and/or pneumatically powered. Other types of actuators are contemplated. In some embodiments, system 1 may also include a protecting mechanism 123 configured to resist movement of the doors under certain circumstances. System 1 may also include one or more haptic feedback components 124. Haptic feedback component(s) 124 may generate feedback in response to a command by controller 100 and/or a sensor 110 detecting an action.

Controller 100 may have, among other things, a processor 101, memory 102, storage 103, an I/O interface 104, and/or a communication interface 105. At least some of these components of controller 100 may be configured to transfer data and send or receive instructions between or among each other. At least some of these components of controller 100 may be configured to generate a control profile for movement of the doors.

Processor 101 may be configured to receive signals from components of system 1 and process the signals to determine one or more conditions of the operations of system 1. Processor 101 may also be configured to generate and transmit a control signal in order to actuate one or more components of system 1. For example, processor 101 may detect the touch of an operator using one or more sensors 110. Processor 101 may receive signals from one or more capacitive or force sensors. Capacitive sensors may receive human body capacitance as input, and force sensors may receive an amount of resistance as input.

In operation, according to some embodiments, processor 101 may execute computer instructions (program codes) stored in memory 102 and/or storage 103, and may perform exemplary functions in accordance with techniques described in this disclosure. Processor 101 may include or be part of one or more processing devices, such as, for example, a microprocessor. Processor 101 may include any type of a single or multi-core processor, a mobile device, a microcontroller, a central processing unit, a graphics processing unit, etc.

Memory 102 and/or storage 103 may include any suitable type of storage provided to store any type of information that processor 101 may use for operation. Memory 102 and storage 103 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 102 and/or storage 103 may also be viewed as what is more generally referred to as a "computer program product" having executable computer instructions (program codes) as described herein. Memory 102 and/or storage 103 may be configured to store one or more computer programs that may be executed by processor 101 to perform exemplary functions disclosed in this application. Memory 102 and/or storage 103 may be further configured to store data used by processor 101.

I/O interface 104 may be configured to facilitate the communication between controller 100 and other components of system 1. I/O interface 104 may also receive signals from one or more sensors 110, and send the signals to processor 101 for further processing. I/O interface 104 may also receive one or more control signals from processor 101, and send the signals to control interface 120, which may be configured to control the operations of one or more sensors 110, one or more actuators 122, protecting mechanism 123, and/or alarm 121.

Communication interface 105 may be configured to transmit and receive data with, among other devices, one or more mobile devices 150 over a network 140. For example, communication interface 105 may be configured to receive from mobile device 150 a signal indicative of unlocking a door. Communication interface 105 may also transmit the signal to processor 101 for further processing.

One or more sensors 110 may be configured to generate a signal for locking, unlocking, opening, and/or closing the door in response to an action by an operator (e.g., a driver, a passenger, or an authorized person who can access the vehicle or open or close the vehicle door). Exemplary action by the operator may include a touch input, a gesture input (e.g., hand waving, etc.), a key stroke, application of force, a sound, speech, face recognition, a finger print, a hand print, or the like, or a combination thereof. In some embodiments, sensors 110 may be configured to activate or deactivate the vehicle in response to the operators action. Sensors 110 may also generate a signal based on the operators action, and transmit the signal to controller 100 for further processing.

Sensors 110 may be located on the exterior side of the door and/or other component(s) inside the vehicle. Sensors 110 may be part of or located on the exterior of the vehicle, such as, for example, an outer belt, an A-pillar, a B-pillar, a C-pillar, and/or a tailgate. Additionally or alternatively, sensors 110 may be located on the interior side of the door and/or other component(s) inside the vehicle. For example, sensors 110 may be part of or located on the steering wheel, the control console, and/or the interior side of the door (not shown). In some embodiments, sensors 110 may be located on or within parts connecting the door and the locking mechanism of the vehicle. Sensors 110 may sense a force pushing the door exerted by the operator inside or outside the vehicle, and generate a signal based on the force. For example, sensors 110 may include a button, a touch pad, a key pad, an imaging sensor, a sound sensor (e.g., microphone), a force sensor, a motion sensor, or a finger/palm scanner, or the like, or a combination thereof.

Control interface 120 may be configured to receive a control signal from controller 100 for controlling, among other devices, sensors 110, alarm 121, actuators 122, protecting mechanism 123, and/or light emitting diodes 130. Control interface 120 may also be configured to control sensors 110, alarm 121, actuators 122, and/or protecting mechanism 123 based on the control signal.

One or more LEDs 130 may be configured to illuminate in response to the detection of an action intended to cause a door to open or close (e.g., in response to controller 100 receiving signals that cause a door to open or close). LEDs 130 may be substantially invisible when not illuminated. For example, an operator looking at a door may not see any indication of LED(s) 130 when the door is closed, and when the operator touches sensor(s) 110, LED(s) 130 may illuminate such that the operator can see them. LEDs 130 may be configured such that when they are illuminated, they display a symbol that represents an entity or a condition, such as a company's logo, a time of day, a symbol indicative of the particular operator, or of a plurality of operators, etc.

According to some embodiments, mobile device 150 may be configured to generate a signal indicative of activating or deactivating the vehicle. In some embodiments, mobile device 150 may be configured to generate a signal indicative of locking, unlocking, opening, or closing a door in response to the operators input. For example, mobile device 150 may transmit the signal to system 1 over network 140. Network 140 may be any type of wired or wireless network that may allow transmitting and receiving data. For example, network 140 may be wired, a local wireless network (e.g., Bluetooth™, WiFi, near field communication (NFC), etc.), a cellular network, or the like, or a combination thereof. Other network types are contemplated. In some embodiments, sensors 110 may receive the signal from mobile device 150. In such an example, LEDs 130, and other components described herein may function in substantially the same manner as if the sensor had received an input intended, to open or close a door such as human touch, a fingerprint, force, etc.

Mobile device 150 may be any type of a general purpose computing device. For example, mobile device 150 may include a smart phone with computing capacity, a tablet, a personal computer, a wearable device (e.g., Google Glass™ or smart watches, and/or affiliated components), or the like, or a combination thereof. In some embodiments, a plurality of mobile devices 150 may be associated with selected persons. For example, mobile devices 150 may be associated with the owner(s) of the vehicle, and/or one or more authorized people (e.g., friends or family members of the owner(s) of the vehicle).

Figure 2:
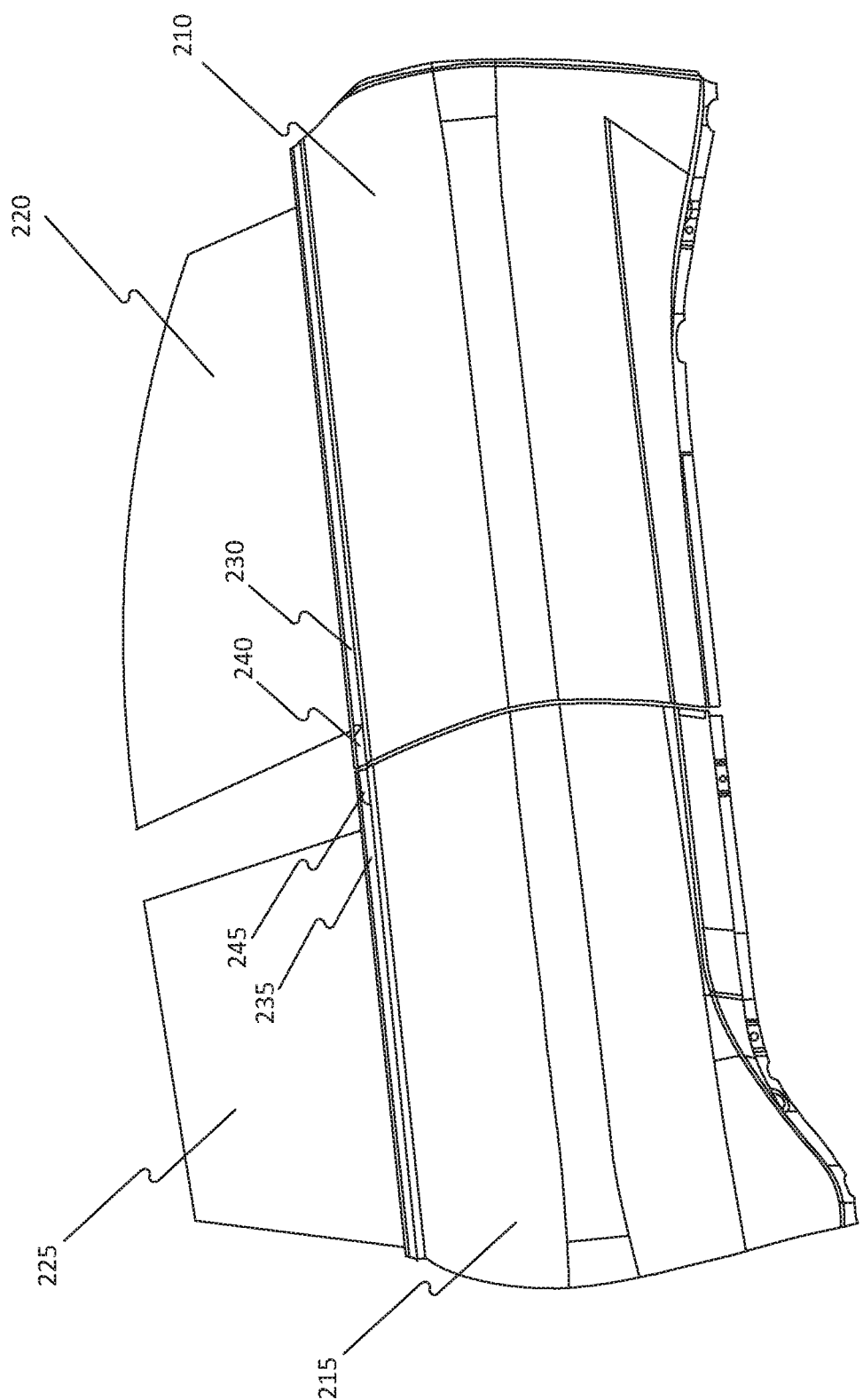
FIG. 2 is a schematic perspective view of an exemplary embodiment of two vehicle doors configured to implement the exemplary system of FIG. 1.

FIG. 2 shows a schematic perspective view of an exemplary embodiment of two vehicle doors configured to implement the exemplary system of FIG. 1. In the exemplary embodiment shown in FIG. 2, system 1 includes a front door 210, a rear door 215, a front window 220, a rear window 225, a belt molding 230 extending along the length of front door 210, a belt molding 235 extending along the length of rear door 215, a sensor 240 mounted on front door 210, and a sensor 245 mounted on rear door 215. In some embodiments, front door 210 may open and close using a hinge coupled to the end of the door closest to the front of the vehicle, and rear door 215 may open and close using a hinge coupled to the end of the door closest to the rear of the vehicle. As shown in FIG. 2, in this exemplary embodiment, opposite from the ends of the doors near the hinges are sensors 240, 245 located near latches that unlatch before doors 210, 215 are opened by actuators 122. It should be understood that in some embodiments, doors 210, 215 may both open in the same direction, such as away from the rear of the vehicle, in the same manner front door 210 is shown in FIG. 2. Moreover, in some embodiments, doors 210, 215 may open upwards (e.g., where the hinges are near the roof of the vehicle).

Figure 3:
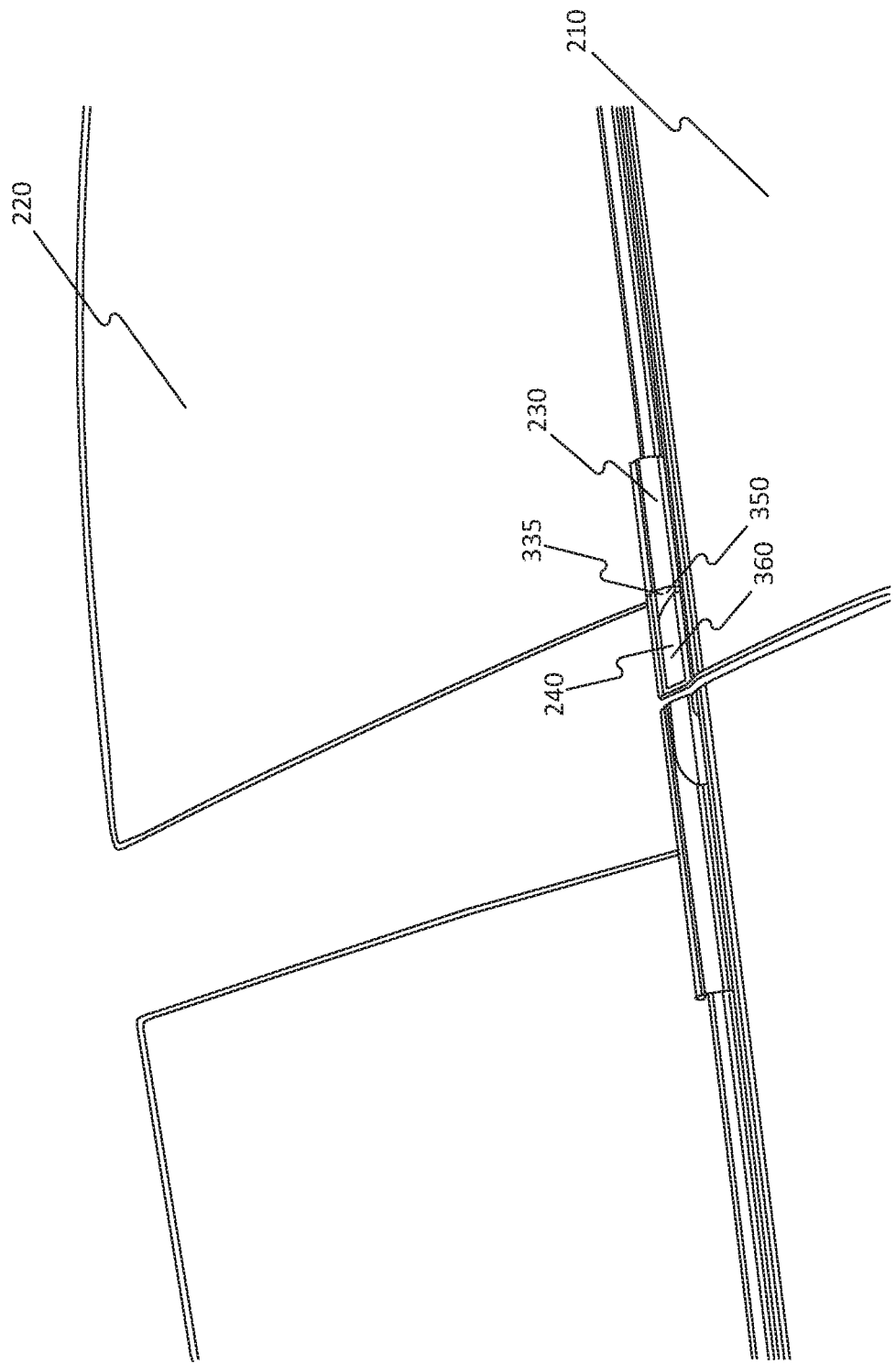
FIG. 3 is a schematic partial perspective view of an exemplary embodiment of two vehicle doors configured to implement the exemplary system of FIG. 1.

FIG. 3 shows a schematic partial perspective view of an exemplary embodiment of two vehicle doors configured to implement the exemplary system of FIG. 1. FIG. 3 is a closer view of the exemplary system 1 shown in FIG. 2. It should be understood that exemplary belt molding 230 is shown in FIG. 3 as extending partially along the length of door 210, and that in some embodiments, belt molding 230 may extend along the entire length of door 210 to an area substantially near the opposite end of the door (e.g., to the opposite end of the door or to a rear-view mirror).

The exemplary embodiment of system 1 shown in FIG. 3 also includes a cap 335. In some embodiments, cap 335 may surround, cover, and/or include sensor 240. A cap outer surface 350 may be flush with belt molding 230 and/or sensor(s) 240, such that the areas where cap 335 abuts (e.g., contacts) sensor(s) 240 and/or belt molding 230 are uninterrupted (e.g., the outer surfaces have substantially the same, or identical, cross-sectional shapes and sizes). Alternatively, in some embodiments, the areas where sensor 240, cap 335, and belt molding 230 approach or abut one another may define grooves that may be very small (e.g., less than a millimeter). In some embodiments where cap 335, sensor(s) 240, and/or belt molding 230 approach or abut one another uninterruptedly, a single covering component (e.g., a capacitive cover) may cover or include cap 335, sensor(s) 240, and/or belt molding 230.

In some embodiments, sensor(s) 240 and/or a sensor outer surface 360 may be the same color as cap 335 and/or belt molding 230. For example, sensor outer surface 360 may be black, and cap outer surface 350 and/or belt molding 230 may also be substantially the same shade of black. Other colors are contemplated. In some embodiments, sensor outer surface 360, cap outer surface 350, and/or belt molding 230 may appear to be metallic. In various embodiments, sensor outer surface 360, cap outer surface 350, and/or belt 230 may be made of the same, or different, materials that possess the same, or different characteristics such as capacitance. In some embodiments, a clear capacitive cover may enclose various components such as a sensor outer surface 360, cap outer surface 350, and/or belt 230.

Figure 4:
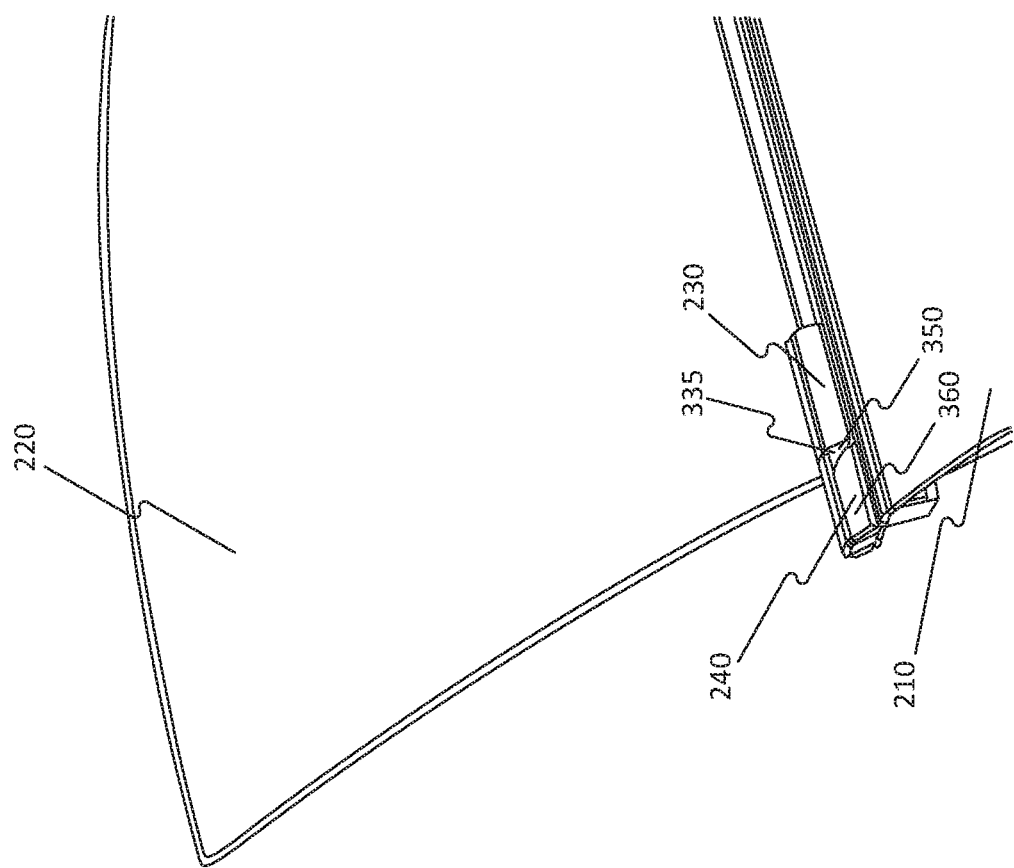
FIG. 4 is a schematic partial perspective view of an exemplary embodiment of a vehicle door configured to implement the exemplary system of FIG. 1.

FIG. 4 shows a schematic partial perspective view of an exemplary embodiment of a vehicle door configured to implement the exemplary system of FIG. 1. FIG. 4 also illustrates exemplary embodiments of front door 210, window 220, belt molding 230, and cap 335. FIG. 4 shows additional portions of exemplary sensor 240, including interior portions of sensor 240 that are, in some embodiments, not visible to an operator when door 210 is closed, unlike sensor outer surface 360.

Figure 5:
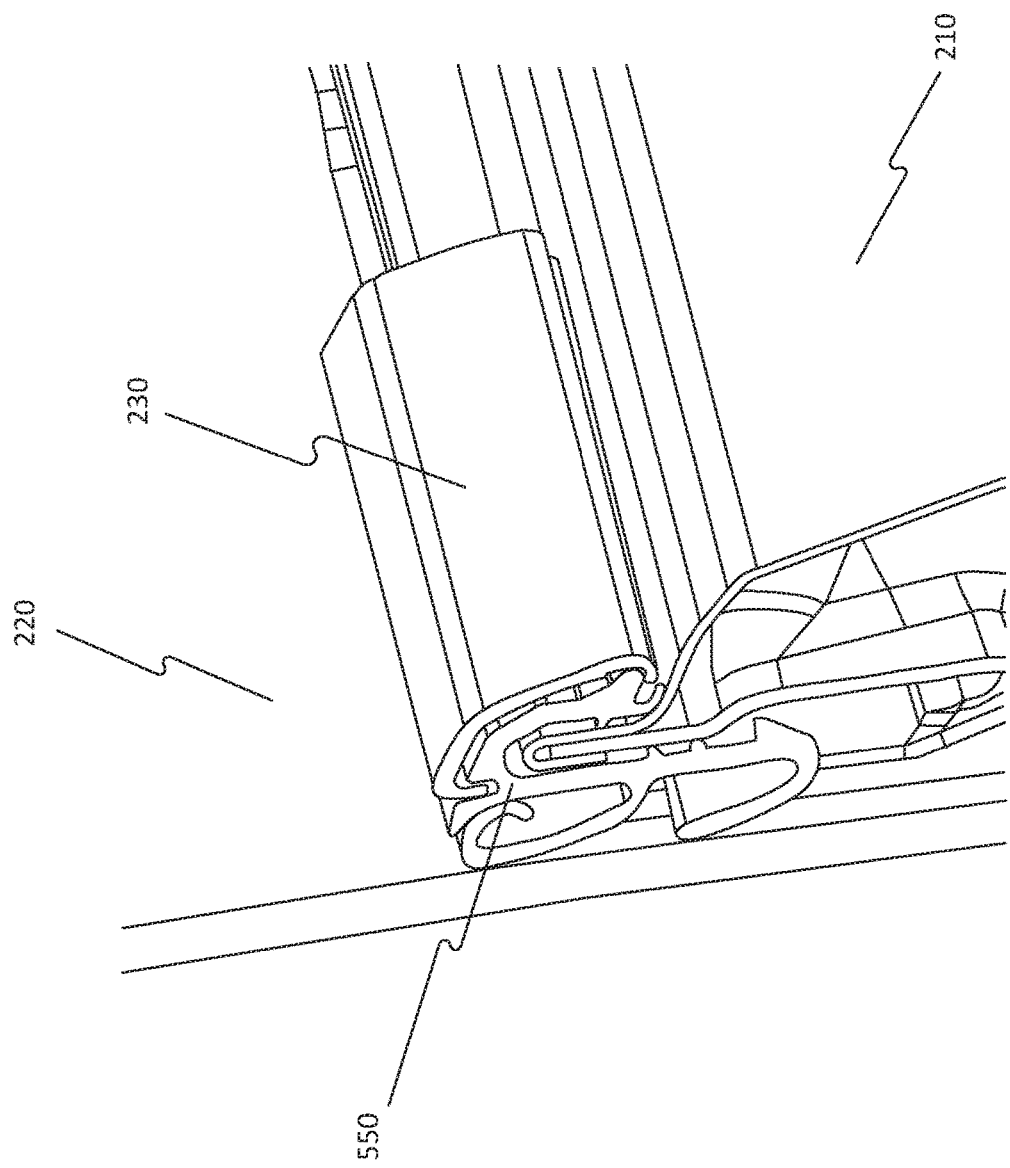
FIG. 5 is a schematic partial perspective section view of an exemplary embodiment of a vehicle door configured to implement the exemplary system of FIG. 1.

FIG. 5 shows a schematic partial perspective section view of an exemplary embodiment of a vehicle door configured to implement the exemplary system of FIG. 1. In addition to exemplary door 210, window 220, and belt molding 230, exemplary weather stripping 550 is shown in FIG. 5. In some embodiments, in addition to belt molding 230, weather stripping 550 may prevent components included within the interior of door 210, such as actuator(s) 122, from exposure to conditions outside the door. For example, weather stripping 550 may prevent components included within door 210 from getting wet during a rain storm.

Figure 6:
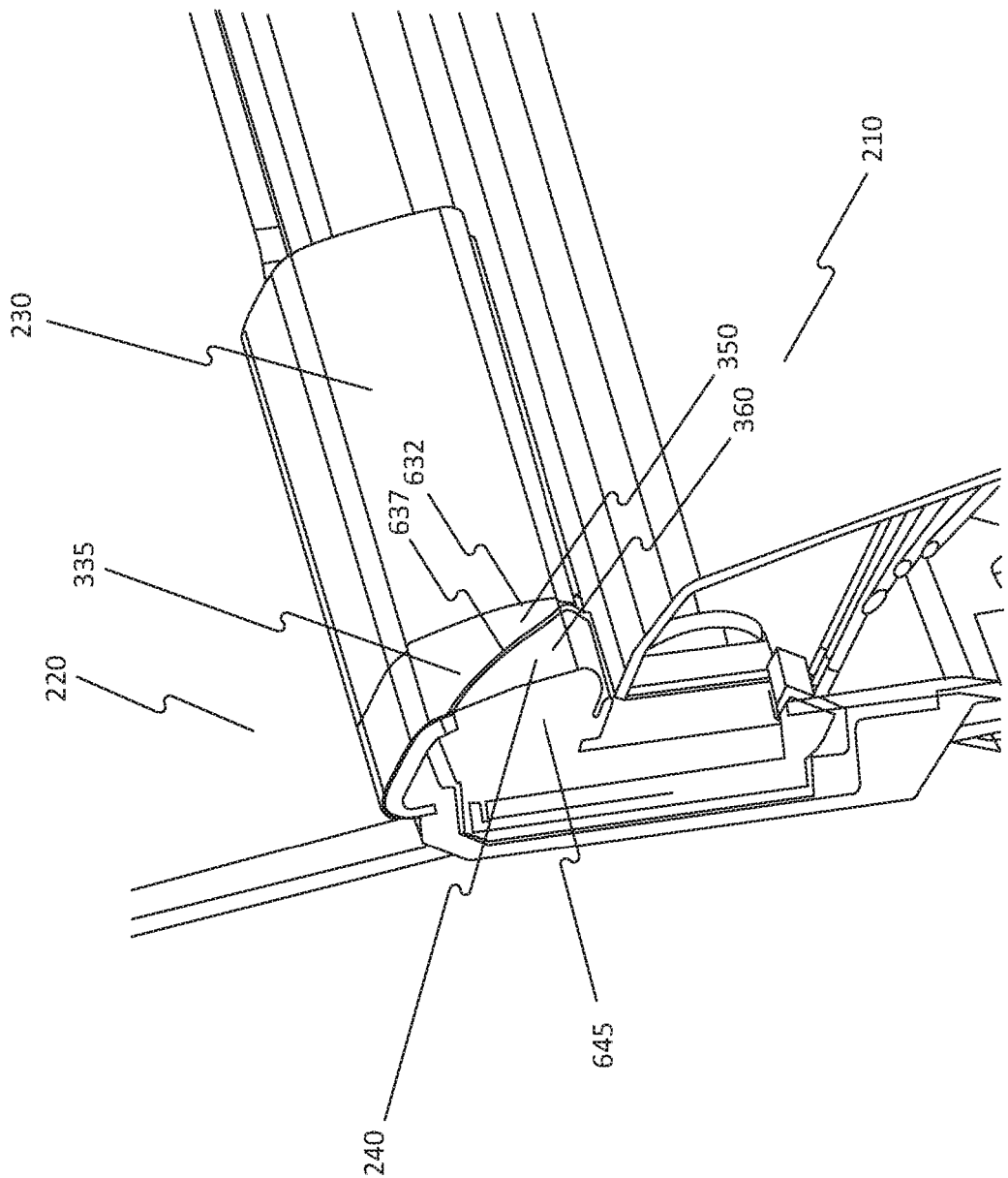
FIG. 6 is a schematic partial perspective section view of an exemplary embodiment of a vehicle door configured to implement the exemplary system of FIG. 1.

FIG. 6 shows a schematic partial perspective section view of an exemplary embodiment of a vehicle door configured to implement the exemplary system of FIG. 1. FIG. 6 shows exemplary door 210, window 220, belt molding 230, cap 335, and sensor(s) 240. In addition, FIG. 6 shows interior sensor portion 645, which may include portions of one or more of sensors 240 that are not visible when door 210 or 215 is closed (e.g., unlike sensor outer surface 360). In some embodiments, interior sensor portion 645 may be covered by a covering component or material that also covers cap 335 and/or belt molding 230.

As described above, in some embodiments, area 632 may include an area where belt molding 230 and cap 335 approach or abut one another, and area 637 may be an area where cap 335 and sensor 240 approach or abut one another. Although not shown in FIG. 6, in some embodiments, there may be an area where sensor 240 approaches or abuts belt molding 230. Areas 632 and/or 637 may define grooves separating cap 335 from belt molding 230, or cap 335 from sensor 240, for example. In some embodiments, areas 632 and/or 637 may be uninterrupted, such that areas 632 and/or 637 are not separated by an apparent or actual groove, and may be smooth to the touch. In such an example, cap sensor(s) 240, cap 335, and belt molding 230 may be smooth to the touch, or otherwise feel as though they are a single component (e.g., such as a belt molding).

Figure 7:
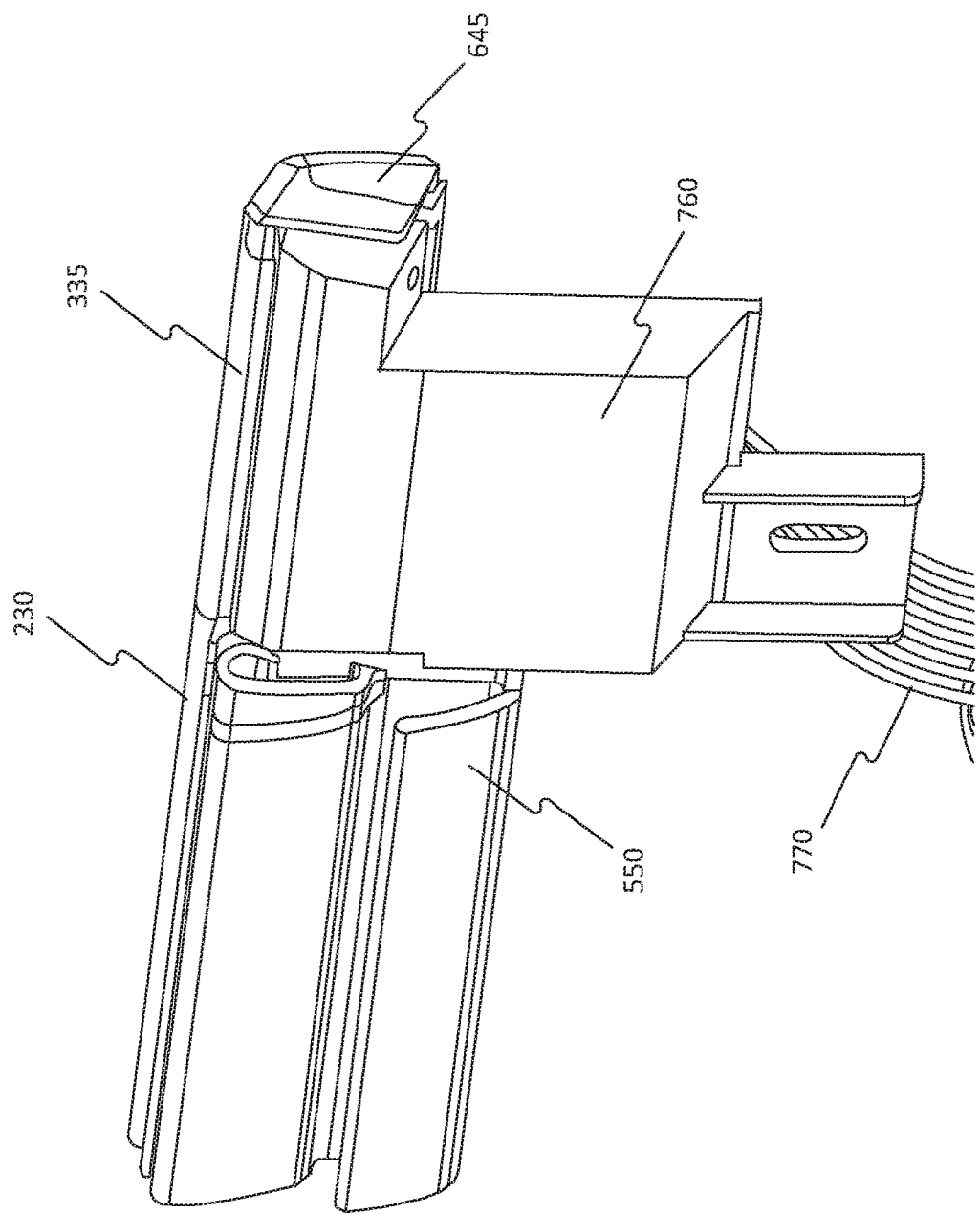
FIG. 7 is a schematic partial perspective view of a back side of exemplary embodiments of a belt molding, weather strip, sensor, and sensor housing configured to implement the exemplary system of FIG. 1.

FIG. 7 shows a schematic partial perspective view of a back side of exemplary embodiments of a belt molding, weather strip, sensor, and sensor housing configured to implement the exemplary system of FIG. 1. FIG. 7 illustrates exemplary belt molding 230, cap 335, interior sensor portion 645, housing 760, and cables 770. Housing 760 may include sensor(s) 240, which may include capacitive, infrared, and/or force sensors. In some embodiments, one or more sensors 240 may be piezoelectric sensors. In some embodiments, one sensor 240 may be used to receive an input to open or close a door in response to another sensor failing (e.g., a piezoelectric sensor may be used when a capacitive sensor fails). In addition, in some embodiments, housing 760 may include haptic feedback component(s) 124, which may cause sensor(s) 240, cap 335, door 210, and/or belt molding 230 to vibrate upon activation. As shown in FIG. 7, exemplary weather stripping 550 may abut housing 760. It is contemplated that in some embodiments, weather stripping 550 may also be included between belt molding 230 and sensor(s) 240, or within, or surrounding, housing 760.

Figure 8:
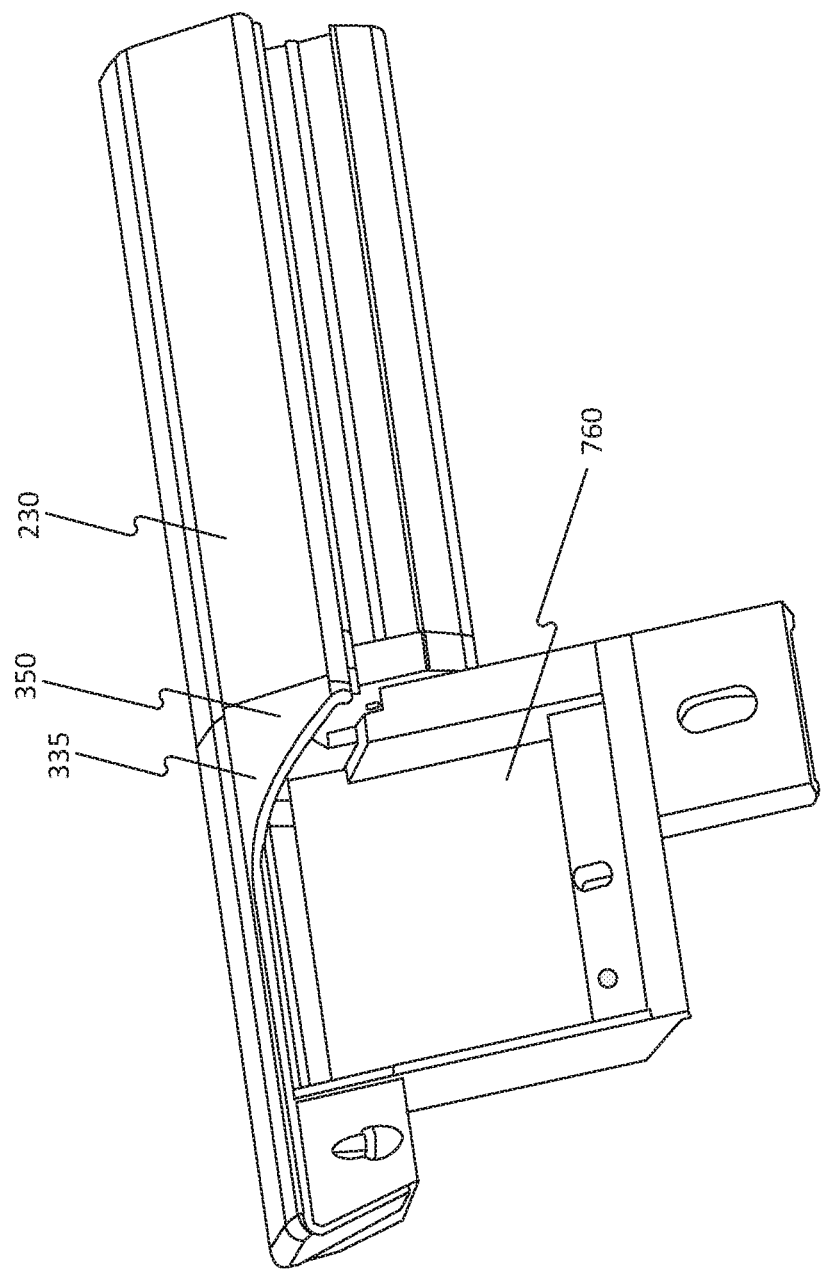
FIG. 8 is a schematic partial perspective view of a front side of exemplary embodiments of a belt molding, a cap, and a sensor housing configured to implement the exemplary system of FIG. 1.

FIG. 8 shows a schematic partial perspective view of a front side of exemplary embodiments of a belt molding, a cap, and a sensor housing configured to implement the exemplary system of FIG. 1. Exemplary housing 760 illustrated in FIG. 8 may be mounted to door 210 or 215. In some embodiments, housing 760 and/or door 210 or 215 may be made of metal, polymer-based materials, and/or composites such as carbon fiber. Housing 760 may also include haptic feedback component(s) 124 and/or LEDs 130. In some embodiments, housing 760 may only include a portion of LEDs 130. For example, some LEDs 130 may be housed in another portion of door 210, or in other doors of a vehicle. It should be understood that additional LEDs 130 may be located in or near other portions of a vehicle, and may illuminate in response to sensor(s) 240 detecting an action intended to cause a door to open or close.

Figure 9:
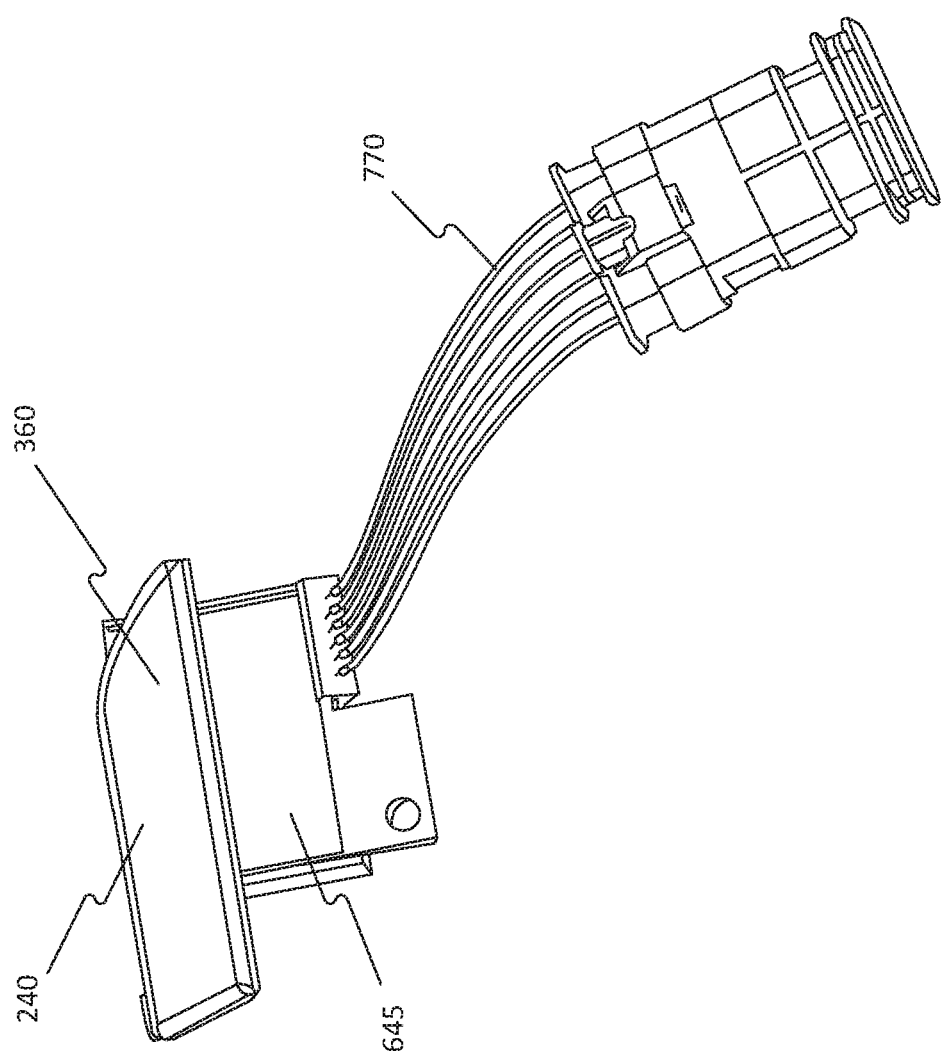
FIG. 9 is a schematic partial perspective view of an exemplary embodiment of a sensor configured to implement the exemplary system of FIG. 1.

FIG. 9 shows a schematic partial perspective view of an exemplary embodiment of a sensor configured to implement the exemplary system of FIG. 1. According to some embodiments, sensor(s) 240 may include an inner sensor portion 645, and cables 770 that may be configured to transport signals from sensor(s) 240 to controller 100. In some embodiments, sensor(s) 240 may include a sub-housing, which may be mounted within housing 760. For example, many components may be located within housing 760, such as a haptic feedback component(s) 124, sensor(s) 240, and/or LED(s) 130.

Figure 10:
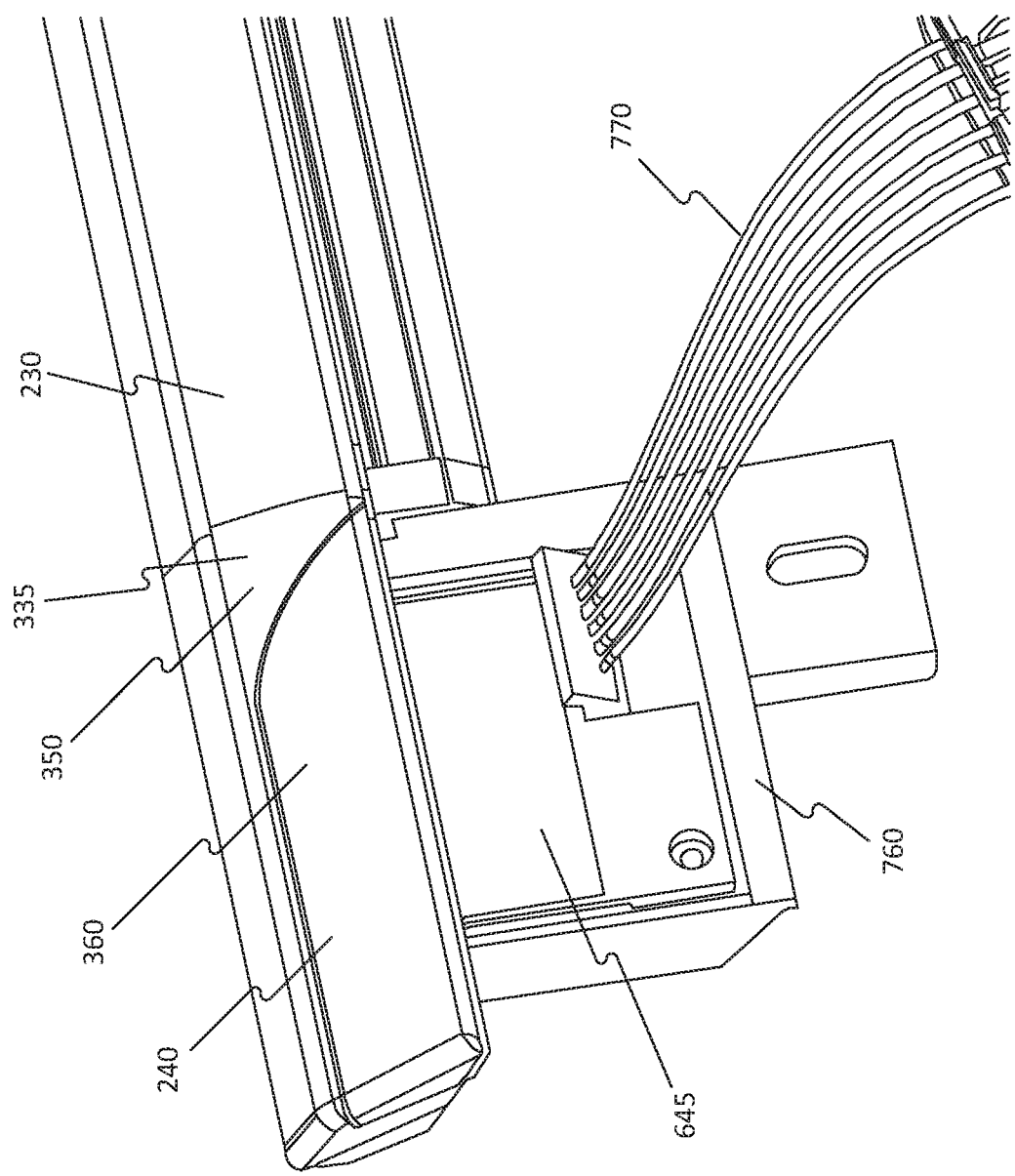
FIG. 10 is a schematic partial perspective view of an exemplary embodiment of a system configured to implement the exemplary system of FIG. 1.

FIG. 10 shows a schematic partial perspective view of an exemplary embodiment of a system configured to implement the exemplary system of FIG. 1. FIG. 10 shows exemplary belt molding 230, sensor 240, cap 335, interior sensor portion 645, housing 760, and cables 770. FIG. 10 illustrates exemplary components discussed herein in an exemplary assembled condition, where belt molding 230 approaches or abuts cap 335, and cap 335 approaches or abuts, and at least partially surrounds sensor(s) 240. In this exemplary assembled condition, interior sensor portion 645 is included in housing 760. In some embodiments, it is contemplated that cap 335 and/or belt molding 230 may completely surround sensor(s) 240, or at least a sensor outer surface 360.

In some embodiments, exemplary components in an exemplary assembled condition as shown in FIG. 10 result in the sensor(s) 240 being configured such that a visual distinction between sensor outer surface 360 and cap outer surface 350 is not apparent, for example, such that sensor(s) 240 and belt molding 230 appear to be a single, integrated, and uninterrupted component.

It will be apparent to those skilled in the art that various modifications and variations can be made to the disclosed systems and methods. Other embodiments will be apparent to those skilled in the art from consideration of the specification and practice of the systems and methods. It is intended that the specification and examples be considered as exemplary only, with a true scope being indicated by the following claims and their equivalents.

What is claimed is:

1. A belt molding and sensor combination for a door of a vehicle, the combination comprising:
    at least one sensor configured to emit signals upon detection of an action intended to cause the door to open or close, the at least one sensor presenting a sensor outer surface and an inner sensor portion;
    cables connecting the at least one sensor to a controller and configured to transport one or more signals from the at least one sensor to the controller, the controller configured to determine a destination position of the door in response to receiving the one or more signals; and
    a belt molding configured to extend along at least a portion of a length of the door, the belt molding comprising a cap presenting a cap outer surface,
    wherein the belt molding is configured to be mounted on the door,
    wherein the sensor outer surface provides an extension of the cap outer surface, such that the sensor outer surface and the cap outer surface combine to provide an uninterrupted outer surface where the sensor outer surface and the cap outer surface contact one another and the cap outer surface extends over the sensor outer surface; and
    wherein the sensor outer surface, the cap outer surface, and the belt molding are made of different materials that possess different characteristics.

2. The belt molding and sensor combination of claim 1, wherein the at least one sensor serves as a portion of the belt molding.

3. The belt molding and sensor combination of claim 1, further comprising: at least one light emitting diode (LED) associated with the at least one sensor.

4. The belt molding and sensor combination of claim 3, wherein the at least one LED is configured to face in a direction away from the door,
wherein the at least one LED is substantially invisible unless illuminated, and
wherein the at least one LED is configured to illuminate in response to the detection of an action intended to cause the door to open or close.

5. The belt molding and sensor combination of claim 1, wherein the at least one sensor comprises a capacitive sensor.

6. The belt molding and sensor combination of claim 1, wherein the at least one sensor comprises a piezoelectric sensor.

7. The belt molding and sensor combination of claim 1, further comprising: at least one component configured to provide haptic feedback in response to the detection of an action intended to cause the door to open or close.

8. The belt molding and sensor combination of claim 1, further comprising: weather stripping included within the belt molding, wherein the at least one sensor is located between the belt molding and the weather stripping.

9. The belt molding and sensor combination of claim 1, wherein the belt molding further comprises weather stripping coupled to the cap and configured to be coupled to the door adjacent a window associated with the door, wherein the weather stripping abuts the at least one sensor or a housing associated with the at least one sensor.

10. The belt molding and sensor combination of claim 1, wherein the sensor outer surface has a first color, and the cap outer surface has a second color, and wherein the first color and the second color are substantially the same.

11. A system for opening and closing a door of a vehicle, the system comprising:
at least one sensor configured to emit signals upon detection of an action intended to cause the door to open or close, the at least one sensor presenting a sensor outer surface and an inner sensor portion;
cables connecting the at least one sensor to a controller and configured to transport one or more signals from the at least one sensor to the controller, the controller configured to determine a destination position of the door in response to receiving the one or more signals;
a belt molding configured to extend along at least a portion of a length of the door, the belt molding comprising a cap presenting a cap outer surface, wherein the belt molding is configured to be mounted on the door, and wherein the sensor outer surface provides an extension of the cap outer surface, such that the sensor outer surface and the cap outer surface combine to provide an uninterrupted outer surface where the sensor outer surface and the cap outer surface contact one another and the cap outer surface extends over the sensor outer surface; and
the controller further configured to:
receive signals from the at least one sensor; and
control operation of an actuator configured to open and close the door in response to receiving the signals; and
wherein the sensor outer surface, the cap outer surface, and the belt molding are made of different materials that possess different characteristics.

12. The system of claim 11, wherein the at least one sensor serves as a portion of the belt molding.

13. The system of claim 11, wherein the system further comprises: at least one light emitting diode (LED) associated with the at least one sensor.

14. The system of claim 13, wherein the at least one LED is configured to face in a direction away from the door, wherein the at least one LED is substantially invisible unless illuminated, and wherein the at least one LED is configured to illuminate in response to the controller receiving the signals.

15. The system of claim 11, wherein the at least one sensor comprises a capacitive sensor.

16. The system of claim 11, wherein the at least one sensor comprises a piezoelectric sensor.

17. The system of claim 11, further comprising: at least one component configured to provide haptic feedback in response to the controller receiving the signals.

18. The system of claim 11, further comprising: weather stripping included within the belt molding, wherein the at least one sensor is located between the belt molding and the weather stripping.

19. The system of claim 11, wherein the belt molding further comprises weather stripping coupled to the cap and configured to be coupled to the door adjacent a window associated with the door, wherein the weather stripping abuts the at least one sensor or a housing associated with the at least one sensor.

20. The system of claim 11, wherein the sensor outer surface has a first color, and the cap outer surface has a second color, and wherein the first color and the second color are substantially the same.

\* \* \* \* \*